US006743102B1

(12) United States Patent
Fiechter et al.

(10) Patent No.: US 6,743,102 B1
(45) Date of Patent: Jun. 1, 2004

(54) INTERACTIVE ELECTRONIC GAME SYSTEM

(75) Inventors: Donald J. Fiechter, Alpharette, GA (US); Réal Cloutier, Duluth, GA (US)

(73) Assignee: World Touch Gaming, Inc., Norcross, GA (US)

( * ) Notice: Subject to any disclaimer, the term of this patent is extended or adjusted under 35 U.S.C. 154(b) by 305 days.

(21) Appl. No.: 09/360,969

(22) Filed: Jul. 27, 1999

(51) Int. Cl.[7] .......................... A63F 13/00; A63F 9/24; A63F 3/06; A63F 1/00; G06F 17/00; G06F 19/00; A63B 71/00
(52) U.S. Cl. ........................ 463/42; 463/16; 463/17; 463/18; 463/21; 463/22; 463/25; 463/40; 463/43; 463/46; 273/269; 273/138.1; 273/148 B
(58) Field of Search .................... 463/42, 10, 16, 463/17, 18, 19, 20, 21, 22, 23, 25, 26, 27, 29, 30, 37, 38, 40, 41, 43, 46; 273/243, 269, 274, 284, 138.1, 148 B

(56) References Cited

U.S. PATENT DOCUMENTS

| | | | | |
|---|---|---|---|---|
| 3,895,807 A | * | 7/1975 | Friedman | 463/22 |
| 4,312,511 A | * | 1/1982 | Jullien | 463/19 |
| 4,323,770 A | * | 4/1982 | Dieulot et al. | 463/25 |
| 4,365,810 A | | 12/1982 | Richardson | |
| 4,475,157 A | * | 10/1984 | Bolan | 364/410 |
| 4,611,811 A | * | 9/1986 | Haase | 463/19 |

(List continued on next page.)

FOREIGN PATENT DOCUMENTS

| | | |
|---|---|---|
| JP | 6-71010 | 8/1992 |
| WO | WO 98/20949 | 11/1997 |

*Primary Examiner*—Teresa Walberg
*Assistant Examiner*—Binh-An D. Nguyen
(74) *Attorney, Agent, or Firm*—Fay, Sharpe, Fagan, Minnich & McKee, LLP

(57) ABSTRACT

An interactive electronic game system is provided. The game system comprises two or more gaming machines each having display means for displaying images thereon and interaction means for an individual player to interact with the game system. A central server unit comprising a game system control means and a communication control means for controlling communications between the central server unit and the gaming machines is provided. A network connects the gaming machines to the central server unit. A random number generating means connects to the central server unit. The central server unit is arranged to play a game in which two or more players select one or more sub sets of indicia from a set of indicia. The selected sub-set is displayed on the display means of each player's respective gaming machine. The random number generating means generates a sequence of random indicia selected from the set of indicia. The central server unit displays in turn each of the randomly generated indicia on the display means of each the gaming machines. When a randomly generated indicia displayed on the display means matches an indicia selected by the player, the player interactively acknowledges the match through the use of the interaction means. A prize is awarded to the player who first interactively acknowledges the required number of matches.

20 Claims, 8 Drawing Sheets

U.S. PATENT DOCUMENTS

| | | | |
|---|---|---|---|
| 4,624,462 A | | 11/1986 | Itkis |
| 4,652,998 A | * | 3/1987 | Koza et al. |
| 4,909,516 A | | 3/1990 | Kolinsky |
| 5,007,649 A | * | 4/1991 | Richardson .................. 273/237 |
| 5,011,157 A | | 4/1991 | Lovell, Sr. et al. |
| 5,054,787 A | * | 10/1991 | Richardson .................. 273/369 |
| 5,088,737 A | | 2/1992 | Frank et al. |
| 5,096,202 A | * | 3/1992 | Hesland ...................... 273/237 |
| 5,159,549 A | * | 10/1992 | Hallman, Jr. et al. ......... 463/26 |
| 5,160,146 A | * | 11/1992 | Greer .......................... 273/269 |
| 5,178,395 A | | 1/1993 | Lovell |
| 5,224,706 A | * | 7/1993 | Bridgeman et al. ........... 463/13 |
| 5,242,163 A | * | 9/1993 | Fulton .......................... 463/13 |
| 5,351,970 A | | 10/1994 | Fioretti |
| 5,494,294 A | * | 2/1996 | Cappetta ..................... 273/269 |
| 5,518,253 A | * | 5/1996 | Pocock et al. ................. 463/19 |
| 5,588,913 A | | 12/1996 | Hecht |
| 5,613,680 A | * | 3/1997 | Groves et al. ............ 273/138.2 |
| 5,624,119 A | * | 4/1997 | Leake ........................ 273/269 |
| 5,639,088 A | * | 6/1997 | Schneider et al. ........ 273/138.2 |
| 5,687,971 A | * | 11/1997 | Khaladkar ................... 273/269 |
| 5,718,631 A | | 2/1998 | Invencion |
| 5,743,526 A | | 4/1998 | Inoue |
| 5,755,619 A | | 5/1998 | Matsumoto et al. |
| 5,782,470 A | * | 7/1998 | Langan ........................ 273/139 |
| 5,813,911 A | * | 9/1998 | Margolin ....................... 463/19 |
| 5,830,069 A | * | 11/1998 | Soltesz et al. ................. 463/42 |
| 5,857,911 A | * | 1/1999 | Fioretti ........................ 463/40 |
| 5,951,396 A | * | 9/1999 | Tawil ............................ 463/19 |
| 6,099,407 A | * | 8/2000 | Parker, Jr. et al. ............. 463/19 |

* cited by examiner

201

120

INTERACTIVE ELECTRONIC GAME SYSTEM

BACKGROUND OF THE INVENTION

The present invention relates to an interactive electronic game system and more particularly to an interactive electronic bingo game system wherein the system manages the game between two (2) or more players. Further, the invention relates to an interactive electronic game system wherein the winnings awarded to a winning player come from the wagers of the other players in the game and are distributed by the interactive electronic game system minus a house management fee. Further, the invention relates to an interactive electronic game system wherein in order to win, a player must interact with the game terminal he is playing in front of, by acknowledging that a number randomly selected by the game system matches the numbers that the player has selected. The winner is the first player to so acknowledges all of his selected numbers.

Bingo game machines, gaming systems and random number generating systems are well known in the art for example U.S. Pat. No. 5,588,913 to Hecht, U.S. Pat. No. 5,088,737 to Frank, et al., U.S. Pat. No. 4,909,516 to Kolinsky, U.S. Pat. No. 4,365,810 to Richardson and PCT International Patent application number 98/20949.

The disadvantage with the above-mentioned prior art comprises the fact that, in some cases, the players are playing against the house, i.e. the management, operator, etc . . . , and not merely playing against each other. The systems mentioned above have an operator or house which may have a stake in who wins or loses the games. Further, the above art does not provide for an interactive game wherein a player has to physically interact with the player terminal in order to advance his game and eventually win.

It would therefore be advantageous to provide for an interactive electronic game system wherein the operator has no stake in who wins or loses the game.

It would further be advantageous to have an interactive electronic game system wherein the winnings may be awarded to the winner from a collection of the wagers from all the participants in the game, and the administration or management fees may be covered by an ante paid by the players for his participation in the game.

It would be further advantageous to provide for an interactive electronic game system wherein safeguards are in place to assure security and accountability for every play.

It would be further advantageous to provide for an interactive electronic game system wherein the players have to physically interact with the player terminal units in order to advance their game and eventually win.

SUMMARY OF THE INVENTION

Electronic games are becoming ever more popular. Bingo is a particular popular game which is played as follows. Traditionally, a player may have one or more cards showing three, four, five, etc . . . columns, each of which presents a selection of, for example, three, four, five or more numbers selected from B1–B15, I16–I30, N31–N45, G46–G60 and O61–O75 or 3 rows consisting of 5 numbers from a group of 1–90. However, any other number of rows or combination of rows may be used in the play of other games. A caller, usually a person associated with the organizer of the bingo game, draws numbers (i.e. balls) at random from a set of balls marked with the numbers from 1 to 75 or 1 to 90, or other range of numbers, and then calls the numbers. The players, upon hearing the numbers being called, mark the drawn numbers on their cards by apposing a chip or ink mark on the drawn numbers. In order to win, a player must be the first who has marked numbers which compose a five-number line which may be vertical, horizontal or diagonal or when the four corners are marked, or when the card is full, or when some other winning pattern or combination of numbers is matched.

In accordance with the present invention, there is provided for an interactive electronic game system wherein the operator, i.e. the owner or the organizer of the game has no stakes in who wins or loses the bingo game. The operator may collect an entry (ante) for each card a player has chosen to play in each game, in order, for example, to cover overhead costs, administration costs, etc . . . When a player wins a bingo game, the player's winnings may be collected from the wagers of all of the other participants in the game. Therefore as may be understood, in accordance with the present invention, at least two (2) active players may be needed in order for a game to begin. As may be understood, this means that the players are playing against each other and not against the interactive electronic game system itself, i.e. the players are not playing against the house. In order for substantial winnings to be awarded, a large number of players participating in a game may be required, or alternatively, the players may be wagering large sums. As may be further understood, the management or house, in order to operate the system, may not need to have a large pool of money ready in advance to cover payouts to the winners, as the winnings are directly related to the number of other participants in the game and to the amount wagered. The winnings may come from the participation of the players which have put up wager chips for the game, i.e. the winnings are determined by the number of participants, and by the amount each participant wagers in that particular play. This is a tremendous advantage for an operator, who need not have (any) money, or very little money, tied up in advance in order to cover payouts to the winners.

Accordingly, the present invention, in a general aspect, may provide for an interactive electronic game system comprising a central server unit, a random number generating unit connected to the central server unit, a player tracking unit connected to the central server unit and a plurality of player terminal units interconnected to each other and the central server unit, and connected to the player tracking unit.

In a further aspect, the present invention may provide for an interactive electronic game system, wherein the games to be played are bingo, Keno, Lotto, poker or any other such type games.

In a further aspect, the present invention may provide for an interactive electronic game system, wherein the random number generating unit may comprise a ball blower unit connected to the central unit. The ball blower unit may be configured and disposed so as to be visible to some, or all of the players which have anted up to play a game, the whole in order to create the atmosphere of a traditional, i.e. non electronic, bingo game. In accordance with yet a further aspect, the random number generating unit may be integrated to or form part of the central server unit, i.e. it may be an electronic random number generating unit. As may be understood, the interactive electronic game system of the present invention may be configured and disposed so as to, as much as possible, replace human intervention by the operator of the bingo game with a mechanical or electronic intervention.

In accordance with a general aspect, there is provided for an interactive electronic game system comprising:

two or more gaming machines each having display means for displaying images thereon and interaction means for a player to interact with the game system, a central server unit connected to said gaming machines comprising game system control means and communication control means for controlling communications between said central server unit and said gaming machines, a random number generating means connected to said central server unit, the control server unit being arranged to play a game in which two or more players select one or more sub-sets of indicia from a set of indicia, said selected sub-set being displayed on the display means of a each player's respective gaming machine, said random number generating means generating a sequence of random indicia selected from said set of indicia, said control server unit displaying in turn each of said randomly generated indicia on the display screen of each said gaming machines, wherein when a randomly generated indicia displayed on said display screen matches an indicia selected by said player, said player interactively acknowledge said match through the use of said interaction means, and wherein a prize is awarded to the player who first interactively acknowledges the required number of matches.

In accordance with a further aspect, there is provided for an interactive electronic game system comprising:

a random number generating means, a central server unit connected to said random number generating means, at least two player terminal units connected to said central server unit, wherein upon receiving a signal from at least one of said player terminals that a player wishes to play a game, said central server unit signals said random number generating means to generate random numbers which are displayed by said central server unit onto said player terminal units, and wherein said players play against each other and not against the system.

In accordance with a general aspect, the game may be played as follows. Each player may be positioned in front of a player terminal unit, also known as gaming machine. The player terminal unit may be configured and disposed to allow a player to stand, or be seated, or to allow a wheelchair bound player to play. The player terminals may further be configured and disposed in any known or desired manner. The player terminal unit may display one or more cards or screens, each of which cards or screens may show a subset of indicia selected from a set of indicia, i.e. the player may select a number of indicia from a set i.e. a larger set of indicia. Said set of indicia may for example comprise numbers, i.e. arabic numbers or roman numbers. However it is understood that the indicia may be any other kind of indicia, such as, for example, playing card (diamonds, clover, harts, spades), fruits, or any other symbol. The winner is the first player who fills a card from the randomly selected numbers or symbols or indicia generated by the random number generating unit (i.e. means). In the bingo variant of the game, the indicia may be numbers selected from 1 to 75 and, may, for example, be divided into a number of columns, for example, five columns may be as follows: B1–B15,I16–I30, N31–N45, G45–G60 and O61–O75. The winner may be the first player who fills a vertical, horizontal or diagonal line, the four corners of the card, or fills the entire card, of matches some other winning pattern or combination of spaces on the card as may be selected by the organizer of the game. In the examples shown herein, each card may consists of a three number selection from B1–B6, I16–I21, N31–N36, G46–G51 and O61–O66. However, it is to be understood that the invention is not to be limited to the example shown.

In accordance with the present invention, in order for a player to participate in the game, and eventually, in order to win the game, a player may be called to actively, physically interact with the player terminal unit. The player who is playing the game may not just look at the machine and let it play. If the bingo variant is being played, for example, when each ball is called, i.e. when each ball has been selected by the random number generating unit, it is then in turn, i.e. one at a time, displayed on the player terminal in front of the player. The number may appear in red, in any other pre-determined color, highlighted, etc . . . and if that number is also a number that is found on one of the playing cards selected by the player, a flashing light may appear beside said number on said playing card. The game system may not automatically match the drawn number, and the number which appears on the player's player terminal. At this point, the player must recognize that one of his numbers from one of his playing cards has been drawn (i.e. selected, called, etc . . . ), and the player must acknowledge the drawn number by pressing the screen approximately in the area of the card(s) having the winning number. This acknowledgement may also be accomplished by pressing the "DAUB" button on the screen or the "PLAY/DAUB" button on the terminal. By pressing on one of those buttons, the player may acknowledge any winning number(s) in any card(s). In other words, the interactive electronic game system will not perform this acknowledgement function automatically for the player, and unless a player is alert and recognises the fact that one of his number has been drawn, the interactive electronic game system will not credit the player with the fact that one of his numbers has been called, and consequently, may loose his wager token. When a player has acknowledged that one of his numbers has been drawn, (i.e. has touched the screen at the appropriate place), a representation of a token which may have appeared above the card may be displaced to be beside the winning number. This whole step, i.e. recognition and acknowledgement by the player that one of his number has been drawn must be completed before the winner is declared, or else the player may forfeit this number. It is understood that the player terminal may comprise interaction means to allow the player to interact with the interactive electronic game system, and that such interaction means may comprise a touch screen, one or more touch buttons, a joy stick or any combination of these.

Once the interactive electronic game system has selected all the winning numbers of a player's card, i.e. there is a winning card, the terminal may advise that player (or players) through a message, for example a flashing sign, a flashing light, etc . . . after which the player must recognised that he has won, and (promptly) acknowledge that he has won by pressing anywhere on the screen or on the physical "PLAY/DAUB" button on the terminal. The player therefore may have a limited time to declare himself the winner before the next ball is drawn, and failure to acknowledge his winning hand before the drawing of the next ball may mean that the player(s) in question may forfeit the victory. The interactive electronic game system may be configured such that the balls may be drawn, for example, every two (2) seconds, meaning that a player has a two (2) second window opportunity to acknowledge a winning ball and eventually a winning game. These and other objects will be made manifest when considering the following detailed specification when taken in conjunction with the appended drawing figures.

DETAILED DESCRIPTION OF THE DRAWINGS

Figure 1:
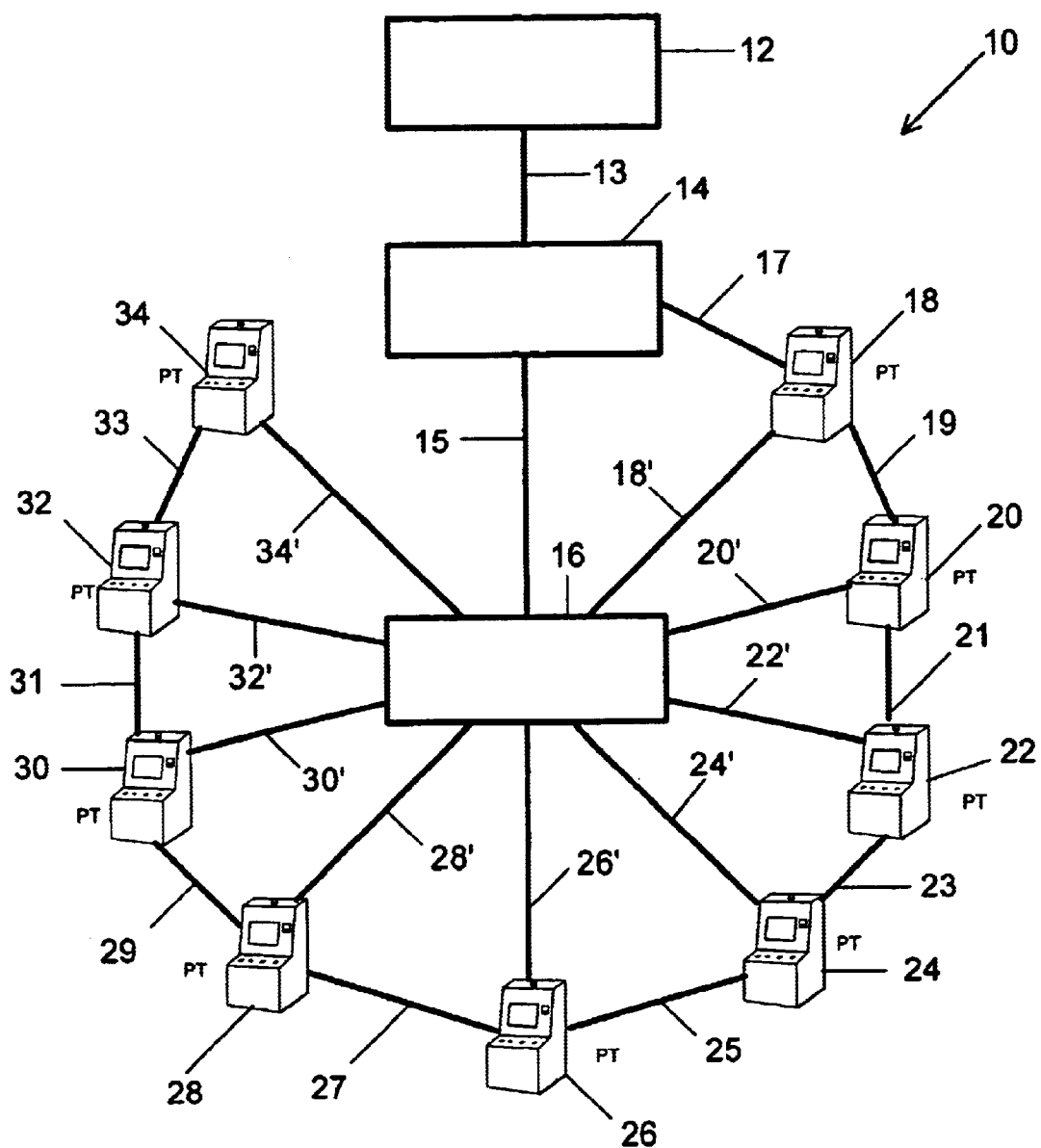
FIG. 1 is a schematic representation of an example embodiment of an interactive electronic game system in accordance with the present invention.

Referring to the drawings and more particularly to FIG. 1, there is shown a schematic view of an example embodiment of an interactive electronic game system 10 in accordance with the present invention. The game system 10 is illustrated in these Figures as being configured to play bingo, but it is understood that the game system 10 may also be configured to play another game, either simultaneously (i.e. on the same screen at the same time as the bingo game is being played) or alternatively (i.e. after the bingo game has been completed). The interactive electronic game system 10 may comprise a random number generator unit, i.e. a random number generator means, illustrated in FIG. 1 as a ball blower unit 12, which may be linked to a central server unit 14 through link 13. The central server unit 14 may be connected to a player tracking unit 16 through link 15. A plurality of player terminal units 18, 20, 22, 24, 26, 28, 30, 32 and 34 may be connected to the player tracking unit 16 through links 18', 20', 22', 24', 26', 28', 30', 32' and 34', and further, may be connected to each other, for example through links (connections) 19, 21, 23, 25, 27, 29, 31 and 33. Although the example game system 10 in accordance with the present invention shown in FIG. 1 comprises 9 player terminal units, it is to be understood that the number of player terminal units is not to be limited as such, and may however number at least two.

The central server unit 14 may comprise a central processing unit, memory, communication software, and any other necessary components and software of a control unit. The central server unit 14 may control communications with all player terminal units, for example terminal player units 18, 20, 22, 24, 26, 28, 30, 32, 34. For example, the central server unit 14 may also perform a variety of additional tasks, such as: may control the distribution of cards to the player terminal units 18, 20, 22, 24, 26, 28, 30, 32, may forward the numbers generated by the random number generating unit, may control the total of the antes during the game, may control the payout of the winnings, and may generally manage and control communications between the various components of the interactive electronic game system. The central server unit may control the pace of the game, by displaying the randomly selected numbers on the screens of the player terminal units at a given selected speed, which may be varied by the operator. The central server unit 14 may also make sure that there is no duplication of cards being played simultaneously, i.e. that two players at, for example, player terminals 28 and 20, are not playing the same card, therefore eliminating the possibility of multiple winners with the same card. The central server unit 14 may also control communication between the player terminal units 18, 20, 22, 24, 26, 28, 30, 32, 34.

The player tracking unit 16 may track, collect, gather and store information on the conduct of the game, on the playing patterns of the players, on their winnings, and regarding any number of other variables. Such data tracking and collection may be real-time, and may be collected from all or some of the player terminal units 18, 20, 22, 24, 26, 28, 30, 32, 34. The player tracking unit 16 may be an integral part of the central server unit 14. However, the player tracking unit 16 may also be an optional element of the interactive electronic game system 10, and it is understood that this feature may be omitted altogether, or may be incorporated into another element of the interactive electronic game system 10. In the event that the player tracking unit 16 is omitted from the interactive electronic game system 10, the central server unit 14 may communicate directly with the player terminal units 18, 20, 22, 24 etc . . . without communicating through the player tracking unit 16, i.e. links 18', 20', 22', 24', 26', 28', 30', 32' and 34' may communicate directly between the player terminal units 18, 20, 22, 24, 26, 28, 30, 32, 34 and the central server unit 14.

The control server unit 14 may therefore communicate with all the components of the interactive electronic game system 10. As stated above, the central server unit 14 may fulfil two (2) main functions, the first is a communication function, and the second is a management function. The management function may comprise such tasks as the starting of the game, the stopping of the game, keeping tally of the player participation i.e. antes, wagers, and bonuses payed into the game and so on. Further, the central server unit 14 may also create the cards which are to be played by the players. In accordance with a particular configuration there may be a possibility of 4,096 different cards used with a bingo configuration. The central server unit 14 assures that each card is unique and used by no more than one terminal at the same time during any one game. Further, the central server unit 14 may update the amount of the bonuses according to the money paid into the game by each player at each terminal. The central server unit 14 may also have the ability to generate and keep in memory a plurality of game functions. Finally, the central server unit 14 may take care of the accounting of the game.

The central server unit 14 may act as a continuous loop. For example, the central server unit 14 may be programmed and/or configured to provide a waiting time of 20 seconds at the beginning of a game, in order to allow players to subscribe, i.e. to ante up, to play the game. At the end of this 20 second period, if there aren't at least two (2) players which have subscribed to at least one card each, the game may be cancelled. If there are two (2) or more players, a signal may be sent to the random number generating unit 12, to start the generation of random numbers. Further, a signal may be sent to each player terminal unit 18, 20, 22, etc . . .

on which a game has been subscribed indicating that a game has begun. The central server unit 14 may then send each number selected by the random number generating unit 12 to each of the player terminal units 18, 20, 22 etc . . . on which a game is being played. When a selected number is sent or forwarded to a player terminal unit, and if that selected number appears on one of the cards, the player terminal unit may display that selected number in red, or in any other manner designed to attract the attention of the player to this fact, for example with a flashing light. Conversely, the player terminal units 18, 20, 22 etc . . . may display a non-winning number in white, or any other non-conspicuous manner. The central server unit 14 may keep track of each subsequent number which is generated. Once a game is over, i.e. when there is a winner, the central server unit 14 may send a further signal to stop the random number generator 12 from the generating any further numbers, and may then calculate the winnings to be awarded the winning player or player(s) and credit the winning player(s) with the winnings. Once all these steps have been completed, a further 20 second period may be initiated by the central server unit 14, thus allowing players to ante up for the next game.

Figure 2:
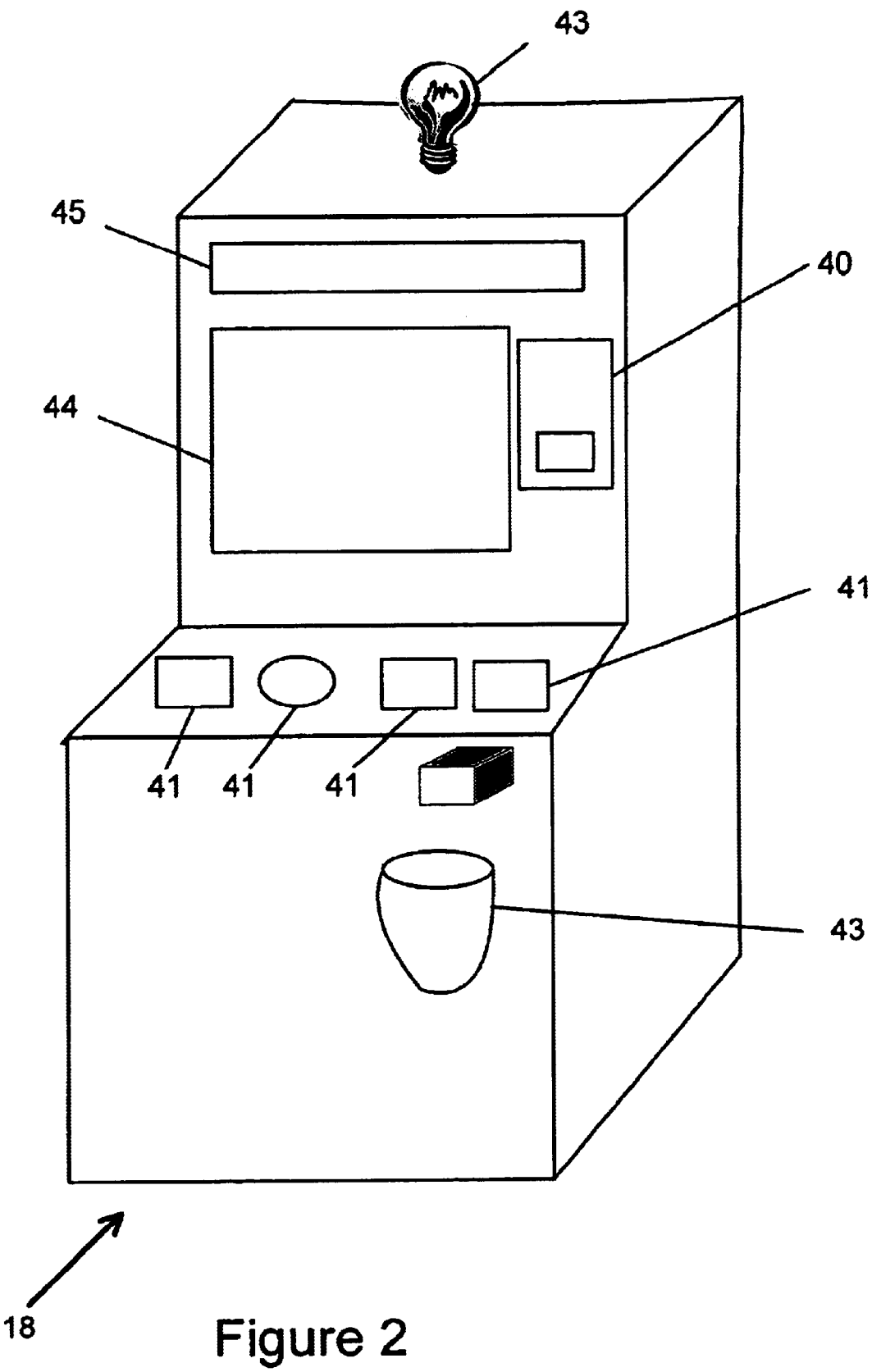
FIG. 2 is a schematic view of an embodiment of a player terminal unit of the interactive electronic game system in accordance with the present invention.

FIG. 2 illustrates a view of a player terminal unit (i.e. gaming machine) such as, for example, player terminal unit 18. The player terminal units 18, 20, 22, 24, 26, 28, 30, 32, 34 may have the same or a similar configuration, and therefore the description will be given with respect to the configuration of player terminal unit 18. It is understood however, that the configuration of the player terminal units may not all be identical. As may be seen, the player terminal unit 18 may comprise a bill or coin or credit card acceptor 40, push buttons 41 and a display screen 44. The display screen may be a cathode ray tube or LCD liquid crystal display, or any other suitable display device for displaying the various screens of a game, i.e. the game itself, and the operations thereon. The display screen 44 may comprise a touch panel which may be configured and disposed so as to allow the player to "touch", i.e. to physically touch the display screen 44 in order to relay to the game his instructions. As may be understood, a touch panel may be a two-dimensional surface extending generally in a slightly curved plane, configured and disposed such that when a player presses a desired position of the touch panel with a finger or the like, the player's choice or intent may be made aware to the control device of the touch panel. The player terminal unit 18 may also comprise an LED 45 to display messages, a tower light 42 to call for help or show a winning terminal, and a receptacle 43 to receive the winnings which may be coins or printed tickets. It is understood that the purpose of the player terminal unit 18 is to allow a player (not shown) to interact with the game system of the present invention, and therefore the controls (i.e. push buttons) 41 may be replaced by other interactive means, for example, a joy stick, a helmet with virtual display capabilities, and other such items.

The player terminal units 18 may further comprise a processing board (not shown) which may be adapted to electronically control the operation and display of the bingo cards, the instructions etc . . . The processing board component may process all graphic and sound functions while managing communication with the central server unit 14 and optionally, the player tracking unit 16.

Figure 3:
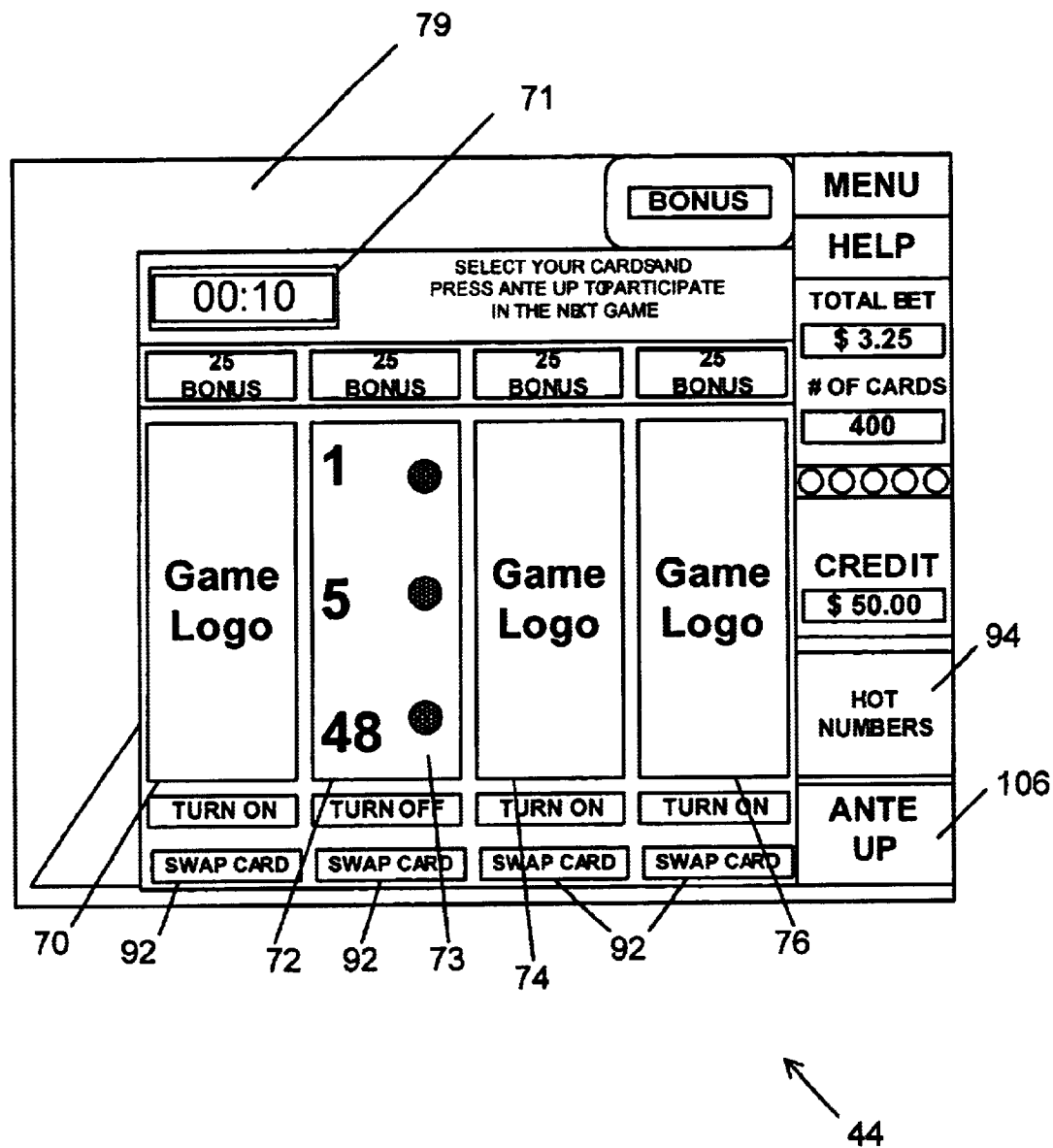
FIG. 3 is a schematic view of a display screen of the player terminal of FIG. 2.

Referring to FIG. 3, there is illustrated a close-up of a display screen 44, showing an example embodiment of the display screen before a game has begun. Display screen 44 is shown as displaying a series of display images 70, 72, 74, 76. Of the display images 70, 72, 74, 76 illustrated in FIG. 3, only display image 72 is shown with a bingo card 73 thereon, which bingo card 73 is shown as having numbers 1, 5, and 48 selected thereon. These numbers 1, 5, 48 may have been manually requested by the player, or alternatively, may have been selected automatically by the game system 10. Display images 70, 74 and 76 are shown as not having a bingo card thereon, meaning that the player has decided not to select a game to be played on these display images. Instead, the unused display images are shown as displaying the ThunderBolt BINGO trademark thereon. The display screen 44 of FIG. 3 further shows a count down time display 71, wherein one can see that there are ten (10) seconds left before the start of the next game. This allows the player to know how much time he has left to decide if he wants to play another game on the unused display images 70, 74, 76. Display screen 44 also has a message board 79 wherein messages and instructions can be given to the player. Although display screen 44 is shown as having 4 display images 70, 72, 74, 76 thereon, it is understood that more or less display images may be displayed on the display screen 44.

Each display image 70, 72, 74 and 76 comprises a SWAP CARD button 92 disposed below it. The SWAP CARD button 92 allows for random selection of the three-number combination bingo card, for example, bingo card 72, meaning that if a player so choses, he may press the SWAP CARD button 92 and the system will select the three numbers of that particular card in accordance with the "hot numbers" selection made by the player. This feature allows a player to easily and quickly re-use the same numbers game after game. In order for a player to select his favourite numbers, he may simply press the HOT NUMBER button 94, which, if pressed, may allow the showing of a second display screen image, as further seen in FIG. 6, from which the player may select his customized numbers.

Figure 4:
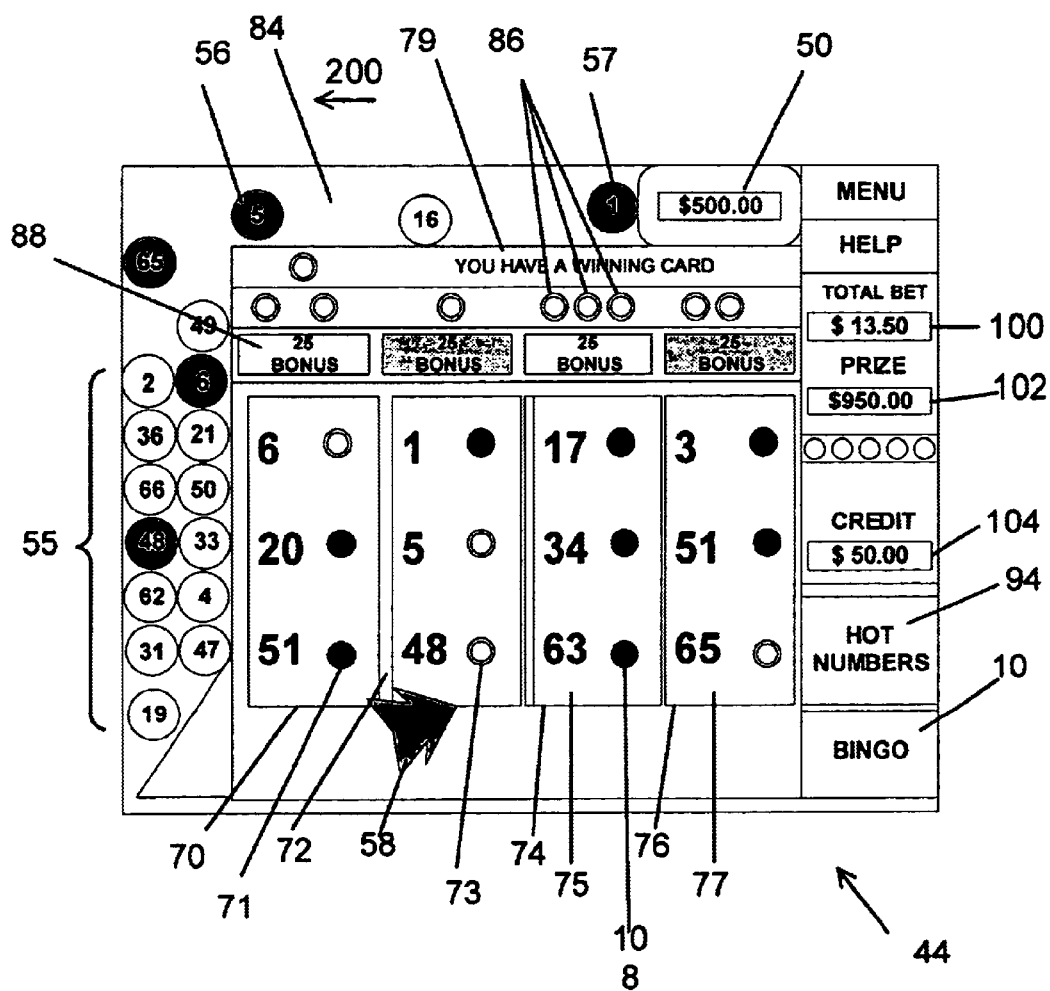
FIG. 4 is a schematic view of a further display screen of the player terminal of FIG. 2.

Referring to FIG. 4, there is illustrated a close up of a display screen 44, showing a game in play. In this illustration, the player has elected to play all four (4) of the available display images, 70, 72, 74, 76, and therefore, each of these has a bingo card 77, 73, 75, and 77 displayed thereon. Each bingo card 71, 73, 75, 77 comprises a combination of three numbers respectively, 6, 20, 51; 1, 5, 48; 17, 34, 63; and 3, 51, 65, which have selected from the available numbers 1 through 66. The available numbers are the first 6 numbers of each letters of a regular Bingo, namely 1 to 6, 16 to 21, 31 to 46, 46 to 51 and 61 to 66. Although shown as having three numbers thereon, it is understood that the bingo card 71, 73, 75, 77 may alternatively be displayed with more or less numbers, for example, may display 5 numbers, for example on some, or all of the cards.

Each number selected on the bingo cards 71, 73, 75, 77 has a dot 108 associated with it. For the sake of clarity, only the dots associated with numbers 51 and 63 are identified with the reference number 108. Each bingo card 71, 73, 75, 77 further has BONUS button 88 which is configured to show the amount of $0.25 thereon. This is the cost of subscribing to the Bonus for each of the bingo cards 71, 73, 75, 77. Thus, a player may decide that, in addition to the ante and the wager on a given bingo card, an additional $0.25 bet entitles the player to play for the bonus amount which may be displayed in window 50.

As shown, the player has selected to play this game with four bingo cards 71, 73, 75, 77. Each of the bingo card 71, 73, 75, 77 may have three playing chips 86 and an ante chip 84. A credit display 104 indicates the credited amounts of either winnings or of money the player has selected to pay into the game. Total bet window 100 indicates the amount that the player has bet on the present game, i.e. for example, $13.50 has been bet, including two $0.25 bonus, four antes at $0.25 each, and twelve playing chips 86 at $1.00 each. Display 102 indicates the available winning prize of the present games, meaning that there is presently $950.00 to be won from the multitude of players who have anted up and wagered this total amount for the game being played. This may be the amount paid out to one or more eventual winners, minus any administrative fees for the operator.

When a player wishes to play a game, the player may simply press the ANTE UP button 106 (as shown in FIG. 3) or the PLAY button 41 on the player terminal unit (as shown in FIG. 2), during the 20 second interval between games, therefore sending a signal to the central server unit 14 that at least one card is to be played. If so wished by the player, more than one card may be selected for play.

Numbers 55 represent the numbers which have been randomly selected by the random number generating unit 12, and which have been put into play in the game. For example, number 5, illustrated by reference number 56, has been drawn by the random number generating unit 12, and has been displayed on the display screen 44. The player's second card 73 shows number 5, and therefore the player was able to mark randomly selected number 5 on his second card 73. In the process, one of the playing chips 86 has been brought down from above the playing card 73, and has been displayed opposite number 5. As may be seen, the numbers are first displayed at the top of display screen 44, and are displaced on the screen in the direction of motion arrow 200. As may further be seen, the last number which has been called, i.e. displayed by the display screen 44, is the number 1, identified by reference number 57. As may be seen, the player's second bingo card 73 has, in its first position, the number 1. The game system 10 has just drawn the player's last number necessary for him to win the game based on the selected numbers of playing card 73, therefore this player has a potential winning card. The terminal may advise the player in the message area 79 with a message YOU HAVE A WINNING HAND, and further, may display a hand icon 58 at the bottom of the winning card 73, and may change the mention in the button 10 from "DAUB" to "BINGO". It is further understood that the game may indicate a potential winning hand in any other manner, or combination of ways. At this point the player has not won, he needs to acknowledge his winning hand by pressing anywhere on the screen or the physical "PLAY/DAUB" button 10 on the terminal before the next ball is called, i.e. before the next ball appears at the top of the screen display 44 (where ball number 1 identified with the reference number 57) is shown. If the player fails to acknowledge his winning, the game will, as the next ball is being called, erase the BINGO sign and the hand sign 58, meaning that it is now too late to acknowledge his winning.

Figure 5:
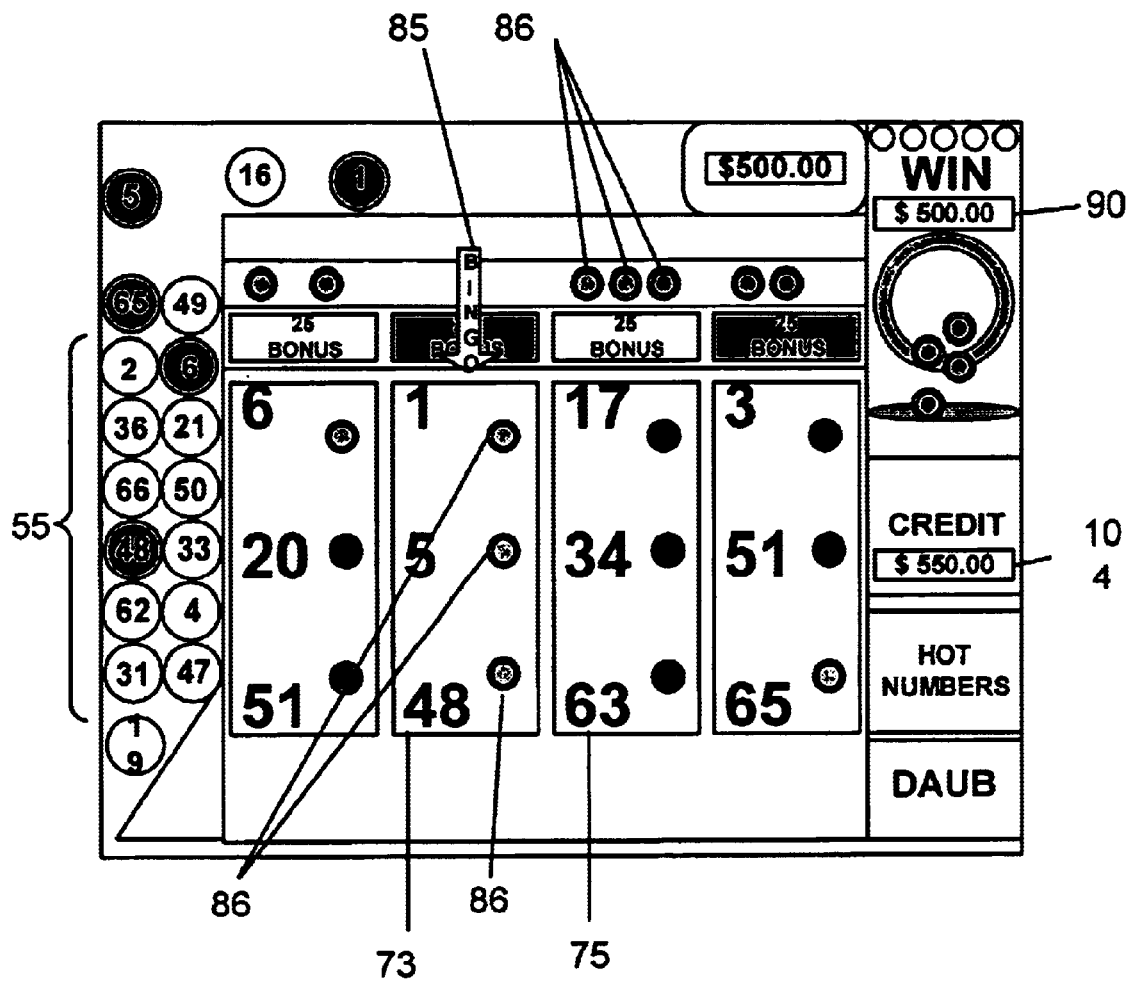
FIG. 5 is a schematic view of yet another display screen of the player terminal of FIG. 2.

Turning to FIG. 5 there is shown a further display screen 44, of the terminal player unit of FIG. 2. As shown, the player's second card 73 is displaying above it the mention BINGO 85. Thus as shown, the number 1, illustrated by reference number 57 (in FIG. 4) having been randomly selected by the random number selection unit 12, the player has acknowledged that he had number 1 available (on bing card 73) and the interactive electronic game system 10 has determined that this particular player displayed three (3) playing chips 86 opposite the three numbers on one of the cards in play. The interactive electronic game system 10 has therefore automatically calculated the winnings attributed to this player at window 90, which in this case is $500. As may be seen, the winnings may be less than was indicated in window 102 of FIG. 4, yet this may be attributable to the fact that more than one winner may have acknowledged his winning hand and to the fact that the amount shown in window 102 of FIG. 4 was before the call of the last ball, so some other chips 86 may have been matched and daubed. The players credit is also immediately displayed in the credit display 104 which shows that the player's credit have increased from the fifty (50) previously shown in FIG. 4. Thus, the interactive electronic game system 10 has credited $500to the winning player, which is the amount that was available from all the chips 86 that were not matched on the cards that were played during that particular game.

As a comparison, player card number 75 does not display a player chip 86 opposite any of the numbers 17, 34 and 63 displayed thereon, since none of these three (3) numbers has been randomly selected by the random number generating unit 12, and are therefore absent from column 55. Thus, the playing chip 86 displayed above game card 74 have not been moved from their position shown in FIG. 4.

Figure 6:
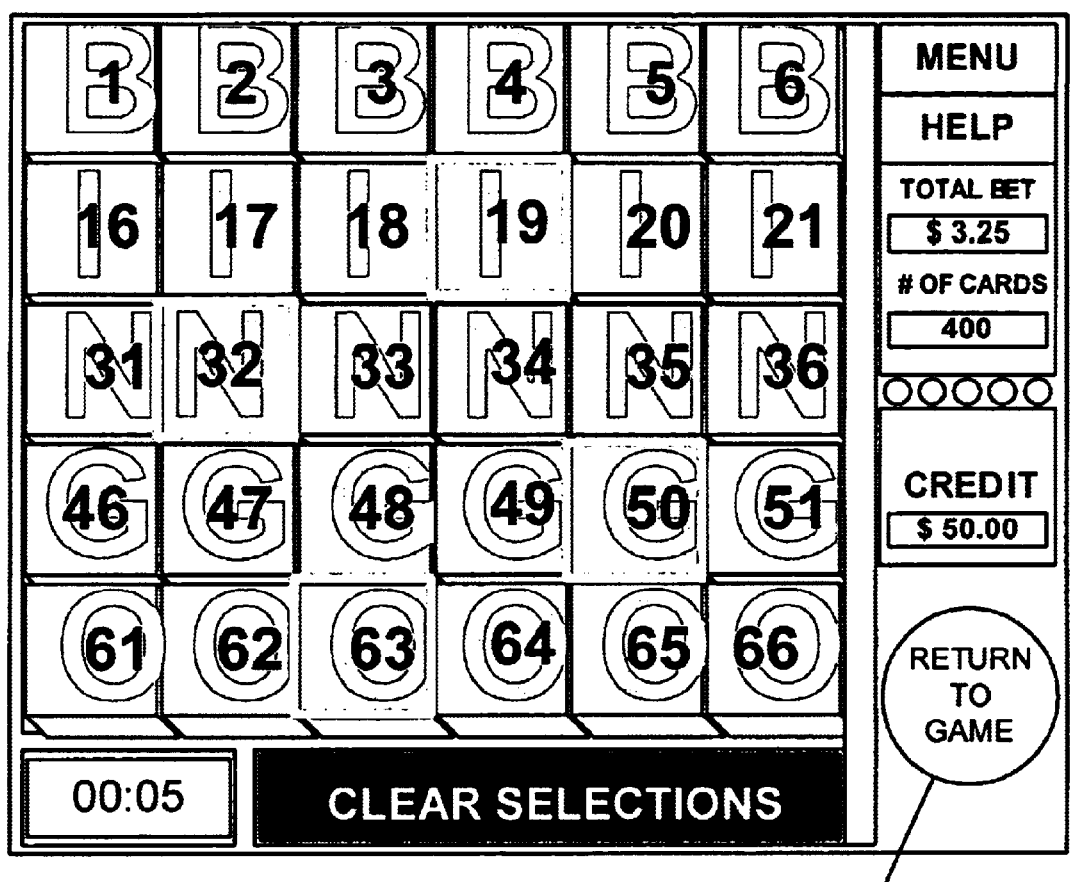
FIG. 6 is a schematic view of a random number generating unit of an interactive electronic game system in accordance with the present invention.

FIG. 6 shows the second display screen image 120, which second display screen image 120 displays the above-mentioned number selections from which the player may select the numbers that he so choses by pressing on them. This second display screen may allow a player who wishes to play, for example, a certain combination of numbers he feels is a lucky one, to do so at his discretion. In other words, if a player has a certain number or combination of numbers which he feels is lucky, he may manually select these numbers rather than having the game system 10 randomly select the numbers for him. Those numbers may be marked so that on any swap card requested the central server unit 14 will give cards with the closest available numbers. Once a player has made his selection, he may press on RETURN TO GAME button 201 in order to return to the game.

Figure 7:
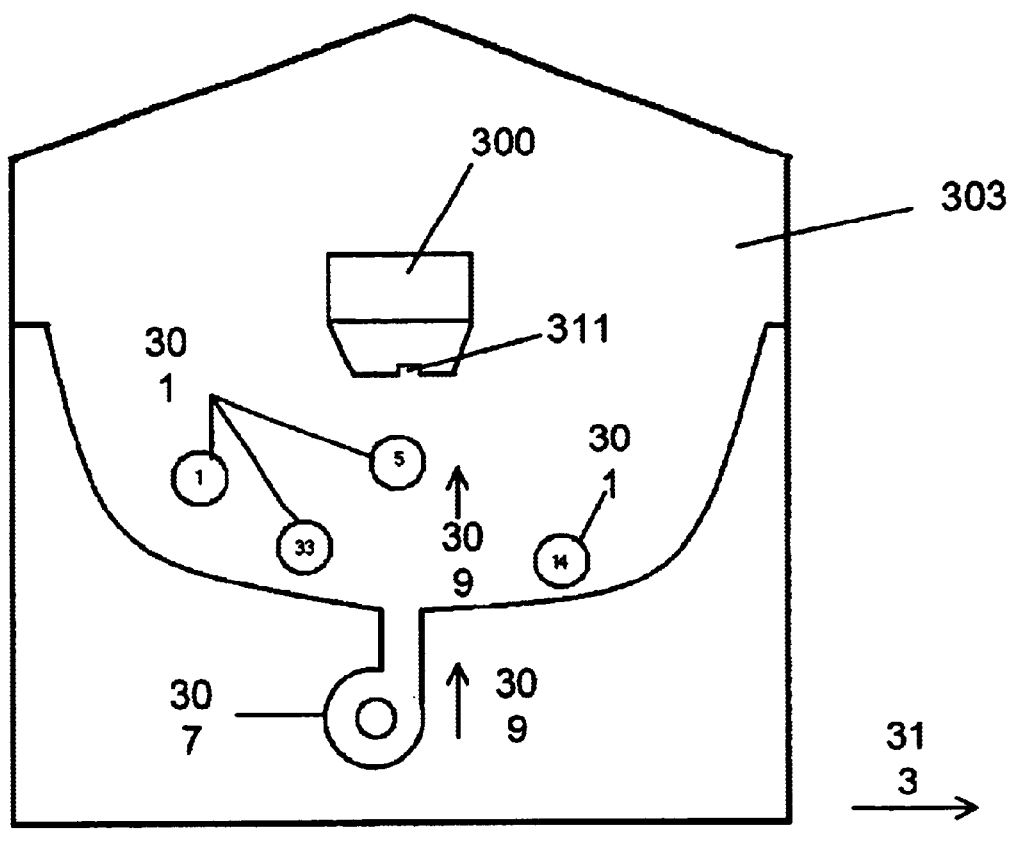
FIG. 7 in a schematic view of a player tracking unit of an example bingo system in accordance with the present invention.

FIG. 7 illustrates a particular embodiment of a random number generating unit 12, in this case a ball blowing unit 12 with a ball recognition system 300. The ball blower unit 12 is a mechanical unit where balls 301 with numbers printed on them are blown into a closed space 303. For the sake of clarity, only balls numbered 1, 5, 14 and 33 are shown, although it is understood that a great many more balls may be found in closed space 303. The balls are blown upwardly in the direction of motion arrow 309 through the action of blower 307. The strength of blower 307 is such that eventually a ball will be made to be introduced into the ball recognition system 300, through opening 311. Randomly, balls will enter opening 311, where they are scanned by a camera or other recognition system included in the ball recognition system 300. An image of the ball, or any other signal recognizing the ball (or its value) is sent to the central server unit 14 via connection 313. The operation of the number generating unit 12 may be controlled by the central server unit 14, namely the control of the beginning and the end of the game, the speed of the game, i.e. the time between the drawing of consecutive balls, etc. . .

Figure 8:
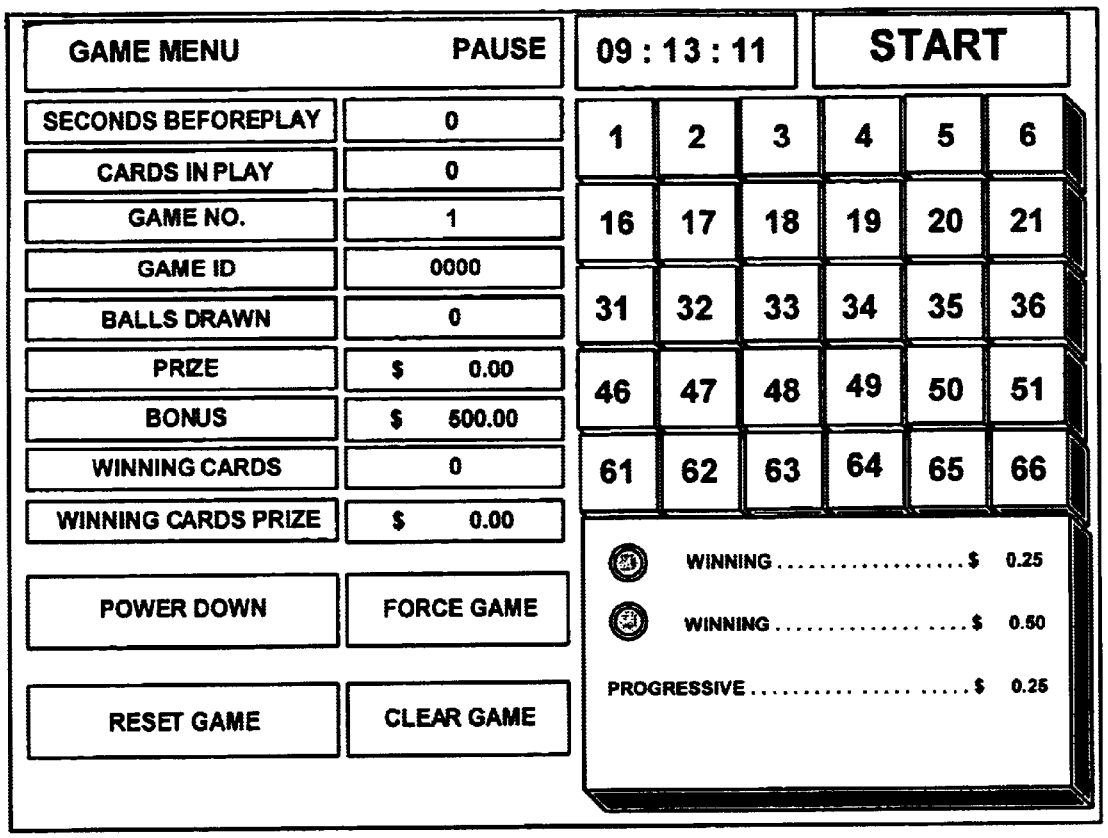
FIG. 8 is a schematic view of a first display screen.
Figure 8:

FIG. 8 illustrates the player tracking unit 16. The player tracking unit 16 is an online data collection program configured, designed and equipped to handle player tracking along with, what is termed in the trade as, back-end accounting. The accounting of the game system is maintained and updated by the central server unit 14 and the player tracking unit 16 which keep track of the various statistics of the game, such as, for example, the total antes collected, the total BONUS wagers in addition to the BONUS on each game, the amount of money that the players have played on the system, the amount of money that is cashed out from the system, the total number of games played, the average number of games played per hour, the average number of cards in play per game, the average amount paid to winners, a time-line breakdown, which may show the above numbers in six different four-hour segments.

In accordance with a particular embodiment of the present invention, the interactive electronic game system may work as follows. A player may insert money i.e. bills, coins, credit cards, debit (bank) cards into the bill acceptor unit 40 of the player terminal 18 as shown in FIG. 2. The game system 10 may then credit that player terminal with the amount of money that has been deposited therein.

A first display image as shown in FIG. 3 may then be presented on the display screen 44. As shown, the count down time display 71 indicates that there are 10seconds before the start of a game. Once the player has selected the number of cards he wishes to play, for example, all four cards as shown on FIG. 4, the player may select the desired number combination either by pressing the SWAP CARD button 92, which requests the central server unit 14 to send a randomly selected three-number combination card, or by pressing the HOT NUMBERS button 94 which brings on display the image 120 as illustrated in FIG. 6 which shows the numbers available for the player's selection. In the configuration as shown in FIG. 6, thirty (30) numbers are shown as available for selection for a given card. The player may then press the desired numbers, and then return to the display by pressing the RETURN TO GAME button 120 before pressing the SWAP button, upon which the central server unit 14 sends available card combinations based on the selected hot numbers. The player may drop the hot numbers selection by hitting the CLEAR SELECTION in the Hot Numbers screen and also by going back to the player menu wherein all hot numbers may be dropped.

When a minimum of two (2) player terminal units have enough credits to play at lest one card per terminal, the central server unit 14 as shown in FIG. 1, may send a request to the player terminal units, for example 18 and 22, five (5) seconds before the next game to remind the player to ante up, through the voice message from the speaker telling the player to "ANTE UP PLEASE". During the 20 seconds interval between each game, the player may press the ANTE UP button 106 of his player terminal unit 18. If the player terminal unit 18 acknowledges that there are enough credit to play, the player terminal 18 may instruct the central server unit 14 of the participation of that player in the next game, and further may indicate the number of cards the player has decided to play, and the bonus amount, if any, that the player has decided to wager. The central server unit 14 may then acknowledge the player terminal unit 18 the participation of the player in the next game. Following this acknowledgement, the central server unit 14 may cause three green chips 86 and a yellow chip 84 to appear above each participating card. The ante chip 84 value, the playing chip 86 value and the BONUS 88 value may be defined in the game configuration by the operator. After the expiry of the 20 second delay, if there are at least 2 players who have anted up, the central server unit 14 may begin a new game, and only the player terminal units where a player has anted up for that game will receive the numbers drawn or selected by the random number generating unit 12. Once a game has begun, a player may select his cards numbers, select his participating cards and make his bonus selection on another player terminal unit which is not participating in the game. A player may play for the bonus with any active cards of his choice. To do so the player may hit, i.e. touch, the BONUS button 88 to highlight it before pressing the "ANTE UP" button 106. To remove his selection the player must touch the "BONUS" button 88 again. By playing the bonus on a card, a player may win the bonus amount, in addition to the possible winning wagers. In order to win the BONUS, the player needs to have selected BONUS for at least one card, and the numbers on the selected card must be the first three numbers drawn in order. The bonus amount available for winning may be displayed in the window of the ball launcher 50. In accordance with a particular configuration of the game system 10, the selection of the cards participating in a given game, the numbers in the cards and the bonus must be selected by the player before pressing the ANTE UP button 106. After a winner is declared, the central unit server 14 may end the game, may manage the winnings from the wagers from the other players on every player terminal unit participating, may also verify if there is a winner of the BONUS. If a winner is declared on the BONUS, the bonus is reset to the base value as determined, and will begin to grow again in relation to the participation of the players. The winner of a game may receive all of the value of the play chips 86 that have been played and not matched, coming from the wages on every player terminal unit playing this game. Alternatively, the winner may receive all of the value of the chips 86 which were not matched on the cards on the player terminal units. In this embodiment, the other (non-winning) players will take back (i.e. will be credited) the value of the play chips 86 that have been matched and DAUBED on their cards. At this point, a further 20 seconds delay may begin in order to allow the players to ante in order to participate in the next game. Keeping the main play at each individual location allows the players to see the actual winner of every game, which may occur on average once every one (1) minute. The cycle for a game is the seconds between each game, and the time to declare a winner during each individual game.

As explained above, a game may start when the 20 second count reaches zero, and if there are at least two players anted up for that game. The antes chips 84 are collected and the player terminal units send them to the central unit 14, and they are the management fees for playing the games. The display screen 44 then broadcasts each ball 64 to all player terminal units as they are drawn. As may be understood, any of the time delays which are incorporated in the game system 10 may be modified by the operator to suit particular game conditions.

The balls may be drawn (i.e. selected) using the technology of a ball blower unit 12 as illustrated in FIG. 7. A ball blower unit may, for instance, be a Vitrina VM-90 Model B™ manufactured by Vaprel. As may be seen, the ball blower unit 12 may comprise an automatic ball recognition system (i.e. means) 300 for recognizing each ball 301 which may be blown up into the recognition system 300. The balls 301 may be displaced with a blowing device such as a fan 307 or blower, in the direction of motion arrow 309. The ball blower unit 12 may send the recognition signal to the central server unit 14. When using the ball blower unit 12, a new ball 301 may be displayed approximately every two (2), four (4) or more seconds, or as programmed by the operator. Alternatively to the ball blower 12 as shown, the interactive electronic game system 10 may select numbers in any other desired or required manner. The numbers may, for example be selected using an electronic random number generator, which may allows for a faster paced game adding greater player appeal. Any other manner of generating numbers may be used.

When a number is drawn, the red dot 108 associated with the matching number which may appear besides the bingo card, and may begin to flash. The player may then press the card having the red flashing dot 108, the DAUB button that may have replaced the ANTE UP button 106, or the physical PLAY button on the player terminal unit, to mark, i.e. to acknowledge, the matching number as called. One of the playing chips 86 may then be moved to cover the red flashing dot 108. If the called number gives the opportunity to the player to win the game, the ANTE UP button 106 will be replaced by the BINGO button and a white hand will appear at the button of the winning card. The player may have to acknowledge his win before the call of the next ball in order to be declared a winner. When a player has covered all three numbers on one card, the system is notified that a player terminal unit has covered three numbers on one card and the player may then be declared a winner. The central server unit advises all the other player terminal units registered in the game that there is a winner. So all player terminal units give back to the credits the playing chips 86 that have been matched. They also send to the central server unit 14 the number of playing chips 86 that have not been matched. After having received the total of playing chips 86 that have not been matched from all the terminals playing in that game, the central server unit 14 calculates the winning amount and sends the winning amount to the winning player terminal unit(s) to be added to his(their) credit, and begin the 20 seconds count down again. If there is more than one winning card, the winning amount is split between them. If there is some remaining credit on that split, the remaining credit is added to the bonus so all the money is going back to the player.

All the information pertaining to each game may be recorded and stored in a memory unit and may be utilized in future reports.

Although particular examples of the interactive electronic game system in accordance with the present invention have been illustrated and described, it is to be understood that the present disclosure is possible without departing from the subject matter coming within the scope of the following claims, which subject matter is regarded as the invention.

We claim:

1. An interactive electronic game system comprising:
   a. two or more gaming machines each having display means for displaying images thereon and interaction means for an individual player to interact with the game system,
   b. a central server unit comprising game system control means and communication control means for controlling communications between said central server unit and said gaming machines,
   c. a network connecting said gaming machines to said central server unit,
   d. a random number generating means connected to said central server unit, the central server unit being arranged to play a game in which two or more players select one or more sub-sets of indicia from a set of indicia,
   said selected sub-set being displayed on the display means of a each player's respective gaming machine, said random number generating means generating a sequence of random indicia selected from said set of indicia, said central server unit displaying in turn each of said randomly generated indicia on the display means of each said gaming machines, wherein when a randomly generated indicia displayed on said display means matches an indicia selected by said player, said player interactively acknowledges said match through the use of said interaction means, and wherein a prize is awarded to the player who first interactively acknowledges the required number of matches.

2. The interactive electronic game system of claim 1 wherein the acknowledgement of a match by a player must occur before the display on said display means of the next randomly generated indicia.

3. The interactive electronic game system of claim 1 wherein the gaming machines comprise a fund acceptance means for selectively paying into the game.

4. The interactive electronic game system of claim 3 wherein a player must ante up and wager a required minimum amount in order to participate in a game.

5. The interactive electronic game system of claim 4 wherein the prize awarded to a winning player is collected from the wagers of the other players.

6. The interactive electronic game system of claim 5 wherein said interactive means is selected from a group comprising joysticks, touch screens and buttons.

7. The interactive electronic game system of claim 1 wherein said game is selected from a group comprising bingo, keno, lotto and poker.

8. The interactive electronic game system of claim 1 wherein said indicia are selected from a group comprising numbers, fruits, harts, clovers, diamonds and spades.

9. The interactive electronic game system of claim 1 wherein said random number generating means is a mechanical ball blower.

10. The interactive electronic game system of claim 1 wherein said random number generating means is integrated with said central server unit.

11. The interactive electronic game system of claim 1 further comprising a player tracking unit connected to said central server unit.

12. The interactive electronic game system of claim 1 wherein said network is a local area network.

13. The interactive electronic game system of claim 1 wherein said random number generating means comprises:
   a. a plurality of balls, each associated with one of said indicia,
   b. mechanical means to mix said balls,
   c. means to successively select a number of said balls,
   d. means to read said indicia on each selected ball,
   e. means to convert said indicia from each selected ball into digital form, and
   f. means to generate a digital image of said indicia.

14. An interactive game system comprising:
   a plurality of game terminals for interacting with a plurality of players, having a display that allows the players to choose a sub-set of indicia from a set of indicia and display the sub-set of indicia;
   a central unit connected to said plurality of game terminals and capable of communicating therewith, the central server capable of randomly generating individual indicia from the set of indicia and communicating the generated individual indicia to the plurality of game terminals; and
   wherein the interaction of the plurality of game terminals further includes displaying the generated individual indicia and allowing the plurality of players to acknowledge a match of a predetermined number of indicia of a player's chosen sub-set of indicia to the generated individual indicia.

15. The interactive game system of claim 14 wherein the chosen sub-set of indicia is selected individually and manually.

16. The interactive game system of claim 14 wherein the central unit comprises a random indicia generator.

17. The interactive game system of claim 14 wherein the game terminals permit the players to wager on a sub-set of indicia in anticipation of the wagered sub-set being the first to match the generated individual indicia.

18. A method for allowing each of a plurality of player terminals connected over a network to communicate with a central processor and interact with one of a plurality of players during the playing of a game, comprising the steps of:

a. interacting with the plurality of players to allow selection of a sub-set of indicia from a set of indicia on one of the player terminals;

b. displaying a player selected sub-set of indicia on one of the player terminals;

c. communicating the selected sub-set of indicia to the central processor;

d. generating a random sequence of indicia from the set of indicia at the central processor;

e. communicating each generated random sequence of indicia to the plurality of player terminals;

f. displaying each of the random sequence of indicia on the plurality of player terminals;

g. selectively interacting with a winning player having a winning sub-set of indicia from the selected sub-set of indicia that match a predetermined number of the generated random sequence of indicia; and h. communicating the selective interaction with the winning player to the remaining plurality of player terminals and the central server.

19. The method of claim 18 wherein step (a) includes the further step of choosing between randomly generated sub-sets of indicia and a manually selected sub-set of indicia.

20. The method of claim 18 wherein step (g) includes the further step of providing the winning player an opportunity to interact with the player terminal for a predetermined period of time.

* * * * *